E. H. BELDEN.
SPRING SUSPENSION FOR VEHICLES.
APPLICATION FILED OCT. 29, 1917.
1,421,758. Patented July 4, 1922.
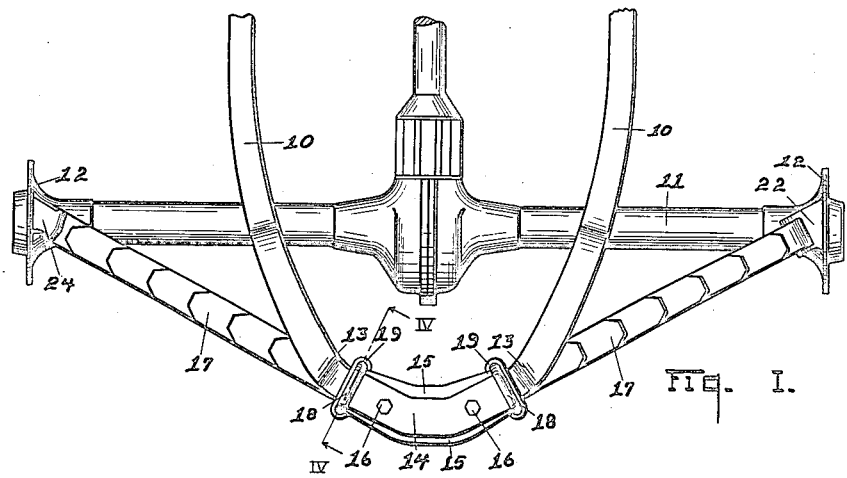
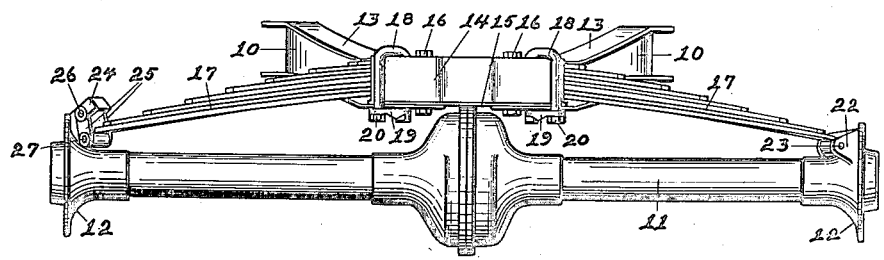
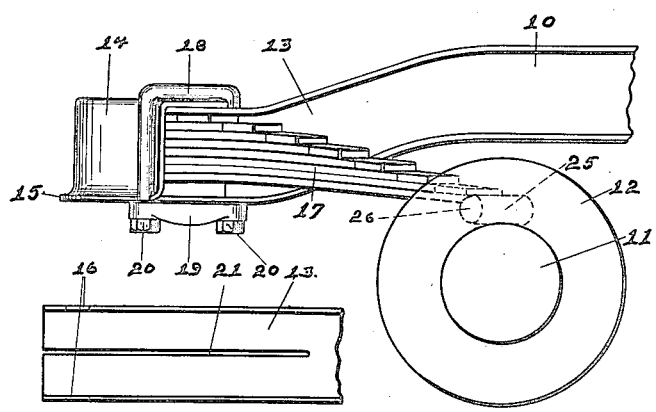
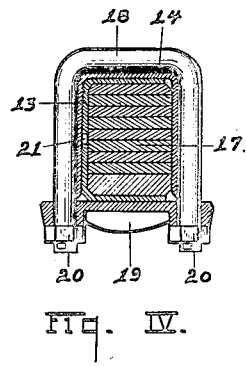
Inventor
Edward H. Belden
By Chester H Brazelton
Attorney

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SPRING SUSPENSION FOR VEHICLES.

1,421,758.

Specification of Letters Patent.   Patented July 4, 1922.

Application filed October 29, 1917. Serial No. 199,052.

*To all whom it may concern:*

Be it known that I, EDWARD H. BELDEN, a citizen of the United States, residing at Toledo, in the county of Lucas and State of Ohio, have invented certain new and useful Improvements in Spring Suspensions for Vehicles, of which I declare the following to be a full, clear, and exact description.

This invention relates to improvements in spring suspension for vehicles.

The principal object of this invention is to provide an improved spring suspension for the rear end of a motor vehicle frame, which is of such a character as to greatly reduce the side sway of the vehicle.

A further object of my invention is to provide a spring suspension having an improved connection between the frame and the springs.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which Fig. I is a top plan view of the rear portion of a motor vehicle chassis embodying my invention.

Fig. II is a view in rear elevation of the rear axle and rear part of the frame.

Fig. III is a fragmentary view in side elevation.

Fig. IV is a detail, sectional view, taken substantially on the line IV—IV of Fig. I, and Fig. V is a detail, fragmentary view of the rear end of one of the channel members of the frame.

In the drawings, similar reference numerals refer to similar parts throughout the several views, and the sectional view is taken looking in the direction of the little arrows at the ends of the section line.

Considering the numbered parts of the drawings, I have shown a vehicle frame comprising the channel-shaped side members 10 and the rear axle 11, which is provided with the brake flanges 12 in the usual manner. The frame members 10 are bent toward each other and the rear ends of said frame members are dropped downwardly as at 13, as shown in Figs. II and III of the drawing. The frame is connected with the axle 11 and supported thereby by means of the springs 17, the inner ends of which are disposed in the channels of the frame members 10 at the rear ends thereof, as clearly shown in Fig. IV of the drawing.

A channel-shaped yoke 14, having a lower flange 15, is disposed over the rear ends 13 of the frame members 10 and over the inner ends of the springs 17, and embraces both of these and serves to retain the ends of the springs in the channels of the frame members 10. Bolts 16 extend through the yoke 14, through the side walls of the channels 13, and through the springs 17, securing the springs in place with reference to the frame, and securing the ends 13 of the frame members 10 together. The base of each channel-shaped frame member 10, at the end 13 thereof, is provided with a longitudinally extending slot 21, so that, when the bolts 16 are drawn up, the side walls of the channel-shaped frame members are drawn towards each other and grip the ends of the springs 17, embraced within them. Shackle bolts 18 embrace the yoke 14 and the frame, and the ends of said shackle bolts extend through blocks 19, disposed beneath the frame members, being secured thereon by the nuts 20 threaded on the lower ends of the shackle bolts 18.

The outer end of one of the springs 17 is directly connected to the axle 11, adjacent the brake flange 12, and the outer end of the other spring 17 is linked to the axle 11, adjacent the brake flange 12. As shown in Fig. II of the drawing, parallel ears 22 are provided on the brake flange 12, extending in the direction of the spring, between which the outer end of the spring 17 extends, and to which said spring is pivotally connected by means of the pin 23. At the other end of the axle, an arm 24 is provided, to which the pair of parallel links 25 are pivotally connected by means of pin 26, said links depending from the arm 24. The outer end of the spring 17 is pivotally connected to the links 25 by means of the pin 27. It will thus be seen that one of the springs 17 is directly connected to one end of the axle 11 adjacent the brake flange 12, by a direct pivotal connection, while the other spring 17 is connected to the other end of the axle casing, adjacent the brake flange 12, through the links 25, so that the end of the spring is linked to the axle and is underslung relative to the arm 24.

This construction provides the necessary amount of side play for the springs and, at the same time, it does away with excessive side sway, which is permitted where the outer ends of both the cantilever springs are connected to the axles through links. By providing the slot in the ends 13 of the frame members 10, the ends of the frame members form a sort of spring clip, which may be drawn tight by means of the bolts 16 and the shackle bolts 18, so as to cause the ends of the frame member to tightly grip the springs 17, which are disposed with them, so that this makes a tight gripping engagement between the springs 17 and the frame members 10 to which they are connected.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a vehicle, the combination of a frame; an axle; and a pair of cantilever springs set out of alignment but with their axes intersecting, each connected at one end to the frame, one of said cantilever springs being pivotally connected directly to one end of the axle, and the other of said cantilever springs being connected to said axle through a link.

2. In a vehicle, the combination of a frame; an axle; a cantilever spring pivotally connected directly to the axle adjacent one end thereof; a link pivotally supported adjacent the other end of said axle; and a cantilever spring pivotally connected to the free end of said link, both of said cantilever springs being rigidly connected to said frame out of alignment with each other and near the longitudinal center line of the frame.

3. In a vehicle, the combination of a frame; an axle; and a pair of cantilever springs set out of alignment but with their axes intersecting, each spring rigidly connected at one end to the frame, one of said springs being pivotally connected directly to the axle adjacent one end thereof, the other cantilever spring being connected to the axle adjacent the other end thereof, through connections including a link suspended from an arm carried by said axle.

4. In a vehicle, the combination of a frame; an axle; a pair of spaced ears formed on said axle, adjacent one end thereof; an arm formed on sid axle, adjacent the other end thereof; a pair of parallel links pivotally connected at their upper ends to said arm; and a pair of cantilever springs set out of alignment but with their axes intersecting, each spring rigidly connected at one end to said frame, one of said springs being pivotally connected to the ears on said axle, the other spring being pivotally connected to the links carried by said axle.

5. In a vehicle, the combination of a frame; an axle; and a pair of cantilever springs, each rigidly connected at one end to said frame substantially in line with the mid point of said axle and in the rear thereof, the other ends of said springs being connected to said axle, one spring being directly and pivotally connected to said axle, and the other spring being connected to the axle through a link.

6. In a vehicle, the combination of a frame; an axle; and a pair of cantilever springs, one end of one spring being pivotally connected directly to the axle, one end of the other spring being pivotally connected to links pivotally connected with the axle, said springs extending from the axle rearwardly, inwardly and upwardly, and having their inner ends rigidly connected to the frame at a point substantially in line with the mid point of the axle and in the rear thereof.

7. in a vehicle, the combination of a frame having the end portion thereof bent downwardly; an axle; and a pair of cantilever springs, one end of one of said springs being connected directly to the axle, one end of the other spring being linked to the axle, said springs extending rearwardly, inwardly and upwardly from said axle and being rigidly connected to the frame at a point substantially in line with the mid point of the axle and in the rear thereof.

8. In a vehicle, the combination of a frame; an axle; and a pair of cantilever springs, each rigidly connected to the frame at a point substantially in line with the mid point of the axle and in the rear thereof, said springs extending from their point of connection with the frame to opposite ends of the axle, one of said springs being directly connected to the axle and the other of said springs being linked to the axle.

9. In a vehicle, the combination of a frame, comprising a pair of channel-members, the ends of which are bent towards each other and abut, the base of each channel at the end thereof being provided with a longitudinally extending slot; an axle; a pair of cantilever springs each connected at one end with one end of the axle, the other ends of said springs being disposed in the channel members of the frame adjacent said slot; and means passing through the side walls of said channel members and drawing the side walls thereof together to grip the springs.

10. In a vehicle, a frame, an axle, and a pair of divergingly extending cantilever springs, each of which is connected at one end to the frame, one of said springs being pivotally connected directly to the axle at its opposite end, and the other of said springs being connected to said axle through a link.

11. In a spring suspension for vehicles, a frame, an axle, a cantilever spring pivotally connected directly to the axle adjacent one end thereof, a link pivotally supported by the axle at a point adjacent the opposite end of the axle, and a cantilever spring pivotally connected to the free end of said link, both of said cantilever springs being rigidly connected to the frame in line with the mid point of said axle and offset therefrom in a direction transversely of the axle.

12. In a spring suspension for vehicles, a frame, an axle, and a spring supporting means secured to the frame substantially in line with the mid point of said axle and in the rear thereof, a pair of springs mounted in said supporting means and connected to the axle at points near the opposite ends of the same by being directly pivoted thereto at one end of the axle, and by being provided with a link connection at the opposite end thereof.

13. In a vehicle, the combination of a frame, an axle, a pair of cantilever springs constituting exclusively the driving connection between the axle and frame, each spring being connected rigidly at one end to the frame substantially in line with the midpoint of the axle, one of said springs being pivotally connected directly to one end of the axle, and the other of said springs being connected to said axle through a link.

14. In an automotive vehicle, the combination of a frame, a driving axle, a pair of springs constituting exclusively the driving connections between the axle and frame, one of the springs being directly secured at different points to the frame and axle, and the other spring being directly secured to the frame at one point and connected to the axle at another point through a link.

15. In a vehicle, the combination of a frame, an axle, a pair of springs, adapted to serve as the driving connections between the axle and frame, one of the springs being directly connected at one end to the frame and at another point to the axle, the other spring being directly connected at one end to the frame and having a link connection through which it is connected at another point to the axle, the springs being arranged so that they converge longitudinally of the frame from one of their ends toward the other.

16. In a vehicle, the combination of a frame, an axle, a pair of springs adapted to serve as the driving connections between the axle and frame, one of the springs being directly connected at one end to the frame, and at another point to the axle, the other spring being directly connected at one end to the frame and having a link connection through which it is connected at another point to the axle, the springs being connected to the frame at one side of the axle and substantially in line with the mid-point of the axle and diverging therefrom.

17. In a vehicle, the combination of a frame, an axle, a pair of springs constituting exclusively the driving connections between the axle and frame, one of the springs being rigidly connected at one point to the frame and directly pivoted at another point to the axle, and the other spring being rigidly connected at one point to the frame and connected through a link at another point to the axle.

18. In a vehicle, the combination of a frame, an axle, a pair of cantilever springs, one of the springs being rigidly connected at one end to the frame and at another point directly pivoted to the axle, the other spring being rigidly connected at one end to the frame and having a link connection through which it is connected at another point to the axle, the springs being arranged so that they converge longitudinally of the frame from one of the ends toward the other.

19. In a vehicle, the combination of a frame, an axle, a pair of cantilever springs one of the springs being rigidly connected at one end to the frame and pivotally connected at another point to the axle, the other spring being rigidly connected at one end of the frame and having a link connection through which it is connected at another point to the axle, the springs being connected to the frame at one side of the axle and substantially in line with the mid-point of the axle.

20. In a vehicle, the combination of a frame, a rear axle, a pair of springs, one of which is rigidly secured at one end to the end of the frame and pivotally connected at another point to the axle, and the other spring being rigidly secured at one end to the end of the frame and linked to the axle at another point, the springs being secured to the frame to the rear of the axle substantially in line with the mid-point of the axle and diverging therefrom.

21. In a vehicle, the combination of a frame, an axle, and a pair of cantilever springs, each rigidly connected at one end to said frame substantially in line with the mid-point of said axle and the rear thereof, the other ends of said springs being connected to said axle, one spring being directly connected to the axle and the other spring being connected thereto through a joint permitting longitudinal movement of the spring.

22. In a vehicle, the combination of a frame, an axle, and pair of cantilever springs, each rigidly connected to the frame at a point substantially in line with the mid-point of the axle and in the rear thereof, said springs extending from their point of connection with the frame to opposite ends of the axle, one of said springs being directly connected to the axle and the other being connected thereto through a joint permitting longitudinal movement of the spring.

23. In a vehicle, the combination of a frame, an axle, and a pair of divergingly extending cantilever springs, each of which is connected at one end to the frame, one of said springs being pivotally connected directly to the axle at its opposite end, and the other of said springs being connected to said axle through a joint permitting longitudinal movement of the spring.

24. In a vehicle, the combination of a frame, an axle, a pair of cantilever springs, one of the springs being rigidly connected at one end to the frame and pivotally connected at another point to the axle, the other spring being rigidly connected at one end to the frame and at another point to the axle through a joint permitting longitudinal movement of the spring, the springs being connected to the frame at one side of the axle and substantially in line with the mid-point of the axle.

25. In a vehicle, the combination of a frame, an axle, and pair of springs attached to the frame, the center lines of said springs meeting at the longitudinal central line of the frame at an angle between 90° and 180°, one of the springs being directly connected with the axle near one end thereof and the other spring being connected with the axle near the opposite end thereof by means of a joint capable of limited movement longitudinally of the spring.

26. In a vehicle, the combination of a frame, an axle, a pair of springs constituting exclusively the driving connection between the axle and frame, said springs being rigidly attached to the frame with their center lines meeting at an angle between 90° and 180°, one of the springs being directly connected to the axle near one end thereof and the other spring being connected with the axle near the opposite end thereof by means of a joint capable of limited movement longitudinally of the spring.

In testimony whereof I affix my signature.

EDWARD H. BELDEN.